US005737686A

United States Patent [19]

Fukui

[11] Patent Number: 5,737,686

[45] Date of Patent: Apr. 7, 1998

[54] CIRCUIT CONTROL APPARATUS FOR SATELLITE COMMUNICATION SYSTEM

[75] Inventor: Satoru Fukui, Kawasaki, Japan

[73] Assignee: Fujitsu Limited, Kanagawa, Japan

[21] Appl. No.: 663,901

[22] Filed: Jun. 14, 1996

[30] Foreign Application Priority Data

Nov. 14, 1995 [JP] Japan .................................... 7-295458

[51] Int. Cl.$^6$ .................................................... H04B 7/185

[52] U.S. Cl. ...................... 455/12.1; 455/34.1; 455/53.1; 455/11.1; 370/316

[58] Field of Search ................................ 455/12.1, 13.1, 455/11.1, 34.1, 34.2, 33.1, 53.1, 54.1, 54.2, 56.1, 67.1, 62, 69, 70; 370/310, 312, 315, 316, 329

[56] References Cited

U.S. PATENT DOCUMENTS 4,870,642 9/1989 Nohara et al. ......................... 455/12.1
5,519,404 5/1996 Cances et al. ......................... 455/12.1
5,537,406 7/1996 Bringer ................................. 455/12.1

FOREIGN PATENT DOCUMENTS 6140968 5/1994 Japan .

*Primary Examiner*—Reinhard J. Eisenzopf
*Assistant Examiner*—Doris To
*Attorney, Agent, or Firm*—Helfgott & Karas, P.C.

[57] ABSTRACT

A satellite communication system has a plurality of transmitting stations, a plurality of receiving stations, and a system control station in a 1 to N system configuration to which the demand-assignment principles are applied for effective utilization of frequencies. A transmission request transmitting units transmits a transmission request to the system control station. A circuit assigning unit assigns a circuit in response to the transmission request. A main information transmitting unit transmits main information to a number of indefinite receiving stations through a circuit which has been assigned. A list-of-transmitting-stations transmitting unit transmits a list of transmitting stations to which circuits have been assigned to each of the receiving stations. Based on the list of transmitting stations, a reception request transmitting unit selects a certain transmitting station from the list of transmitting stations and transmits a reception request with respect to the selected transmitting station to the system control station. A circuit indicating unit indicates a circuit of the selected transmitting station to the receiving station from which the reception request has been transmitted, in response to the reception request. A main information receiving unit receives the main information from the main information transmitting unit of the corresponding transmitting station through the circuit which has been indicated.

10 Claims, 13 Drawing Sheets

1
TRANSMITTING STATION
1a
TRANSMISSION REQUEST TRANSMITTING MEANS
MAIN INFORMATION TRANSMITTING MEANS
1b

2
SYSTEM CONTROL STATION
2a
CIRCUIT ASSIGNING MEANS
2b
LIST-OF-TRANSMITTING-STATIONS TRANSMITTING MEANS
2c
CIRCUIT INDICATING MEANS

3
RECEIVING STATION
3a
RECEPTION REQUEST TRANSMITTING MEANS
MAIN INFORMATION RECEIVING MEANS
3b

CIRCUIT CONTROL APPARATUS FOR SATELLITE COMMUNICATION SYSTEM

BACKGROUND OF THE INVENTION (1) Field of the Invention

The present invention relates to an apparatus for controlling circuits of a satellite communication system, and more particularly to a circuit control apparatus for a satellite communication system having a plurality of transmitting stations, a plurality of receiving stations, and a system control station.

(2) Description of the Related Art

In the art of transmission of a digital video signal in a broadcast format via a communication satellite, recent years have seen a tendency to reduce a bandwidth occupied by the digital video signal thereby to increase the number of channels that are handled by one transponder of the communication satellite.

Conventionally, in a 1 to N satellite communication system configuration, a circuit (frequency) available to transmit and receive signals from the transmitter to the receivers is predetermined and does not change in a normal mode of operation. Specifically, the transmission of video signals from a broadcasting station via a broadcasting satellite and also the simultaneous transmission of multiple-address information from a regional governmental office to a plurality of municipal offices in a satellite anti-disaster communication network take place through predetermined communication circuits.

Another satellite communication system known as a demand-assignment satellite communication system is limited to a 1 to 1 system configuration. In the demand-assignment satellite communication system, a certain number of circuits are available, and when a call is made, one of the circuits is assigned to the call, and upon completion of the call, the circuit is deactivated and returned for assignment to another call.

If the transmitter transmits signals intermittently, e.g., several times a day, rather than transmitting signals at all times, in the 1 to N satellite communication system configuration, then the circuit assigned to the transmitter is not used while no signals are being transmitted from the transmitter. For this reason, there has been a demand in the art for applying the demand-assignment principles to the 1 to N satellite communication system.

There is also a need for facilitating circuit changes in order to allow satellite transponders to change their mode of use with freedom.

SUMMARY OF THE INVENTION

It is a first object of the present invention to provide a circuit control apparatus for a satellite communication system in which the demand-assignment principles are applied to a 1 to N satellite communication system for effective utilization of frequencies.

A second object of the present invention is to provide a circuit control apparatus for a satellite communication system which allows satellite transponders to change their mode of use with freedom.

To achieve the above object, there is provided in accordance with the present invention an apparatus for controlling circuits of a satellite communication system having a plurality of transmitting stations, a plurality of receiving stations, and a system control station, comprising transmission request transmitting means disposed in each of the transmitting stations, for transmitting a transmission request, circuit assigning means disposed in the system control station, for assigning a circuit in response to the transmission request from the transmission request transmitting means, main information transmitting means disposed in each of the transmitting stations, for transmitting main information to each of receiving stations through a circuit which has been assigned to the transmitting station of its own by the circuit assigning means, list-of-transmitting-stations transmitting means disposed in the system control station, for transmitting a list of transmitting stations to which circuits have been assigned to each of the receiving stations, reception request transmitting means disposed in each of the receiving stations, for selecting a certain transmitting station from the list of transmitting stations transmitted from the list-of-transmitting-stations transmitting means and transmitting a reception request with respect to the selected transmitting station to the system control station, circuit indicating means disposed in the system control station, for indicating a circuit of the selected transmitting station to the receiving station from which the reception request has been transmitted, in response to the reception request from the reception request transmitting means, and main information receiving means disposed in each of the receiving stations, for receiving the main information from the main information transmitting means through the circuit which has been indicated from the circuit indicating means to the receiving station of its own.

To achieve the above object, there is also provided in accordance with the present invention an apparatus for controlling circuits of a satellite communication system having a 1 to N system configuration including transmitting stations, receiving stations, and a system control station connected to the transmitting and receiving stations, comprising transmission request transmitting means disposed in each of the transmitting stations, for transmitting a transmission request, circuit assigning means disposed in the system control station, for assigning a circuit in response to the transmission request from the transmission request transmitting means, main information transmitting means disposed in each of the transmitting stations, for transmitting main information to a number of indefinite receiving stations through a circuit which has been assigned to the transmitting station of its own by the circuit assigning means, list-of-circuits transmitting means disposed in the system control station, for transmitting a list of circuits which have been assigned to the transmitting stations to each of the receiving stations, and main information receiving means disposed in each of the receiving stations, for selecting a circuit of a certain transmitting station based on the list of circuits transmitted from the list-of-circuits transmitting means, and receiving the main information transmitted from the transmitting station through the selected circuit.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

The principles of a circuit control apparatus for a satellite. communication system according to the present invention will first be described below with reference to FIG. 1.

Figure 1:
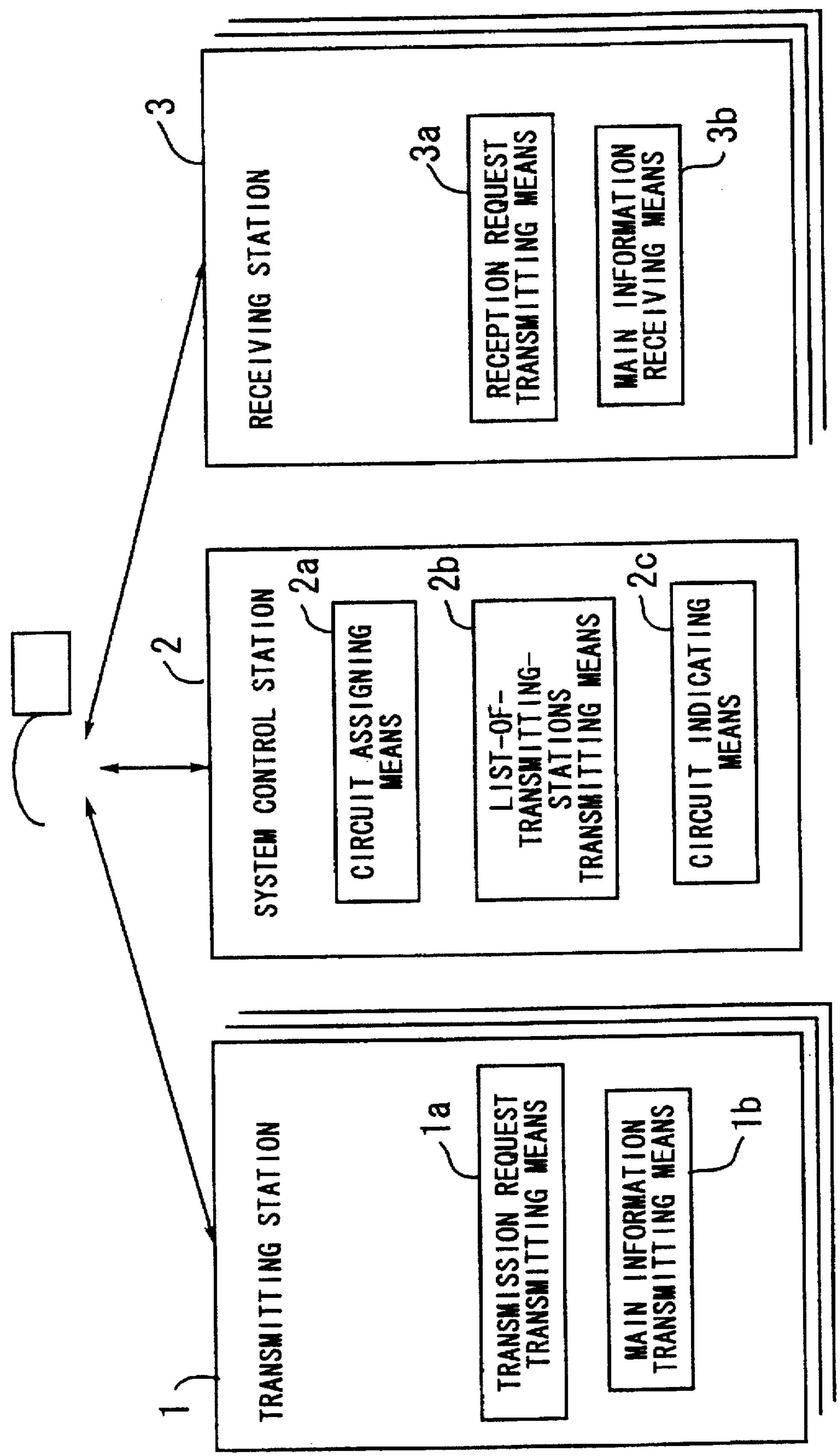
FIG. 1 is a block diagram showing the principles of the present invention.

As shown in FIG. 1, the circuit control apparatus comprises a transmission request transmitting means 1*a* disposed in each of transmitting stations 1, for transmitting a transmission request, a circuit assigning means 2*a* disposed in a system control station 2, for assigning circuit in response to the transmission request from the transmission request transmitting means 1*a*, a main information transmitting means 1*b* disposed in each of the transmitting stations 1, for transmitting main information to a number of indefinite receiving stations through a circuit which has been assigned to the transmitting station of its own by the circuit assigning means 2*a*, a list-of-transmitting-stations transmitting means 2*b* disposed in the system control station 2, for transmitting a list of transmitting stations to which circuits have been assigned to each of receiving stations 3, a reception request transmitting means 3*a* disposed in each of the receiving stations 3, for selecting a certain transmitting station from the list of transmitting stations transmitted from the list-of-transmitting-stations transmitting means 2*b* and transmitting a reception request with respect to the selected transmitting station to the system control station 2, a circuit indicating means 2*c* disposed in the system control station 2, for indicating a circuit of the selected transmitting station to the receiving station from which the reception request has been transmitted, in response to the reception request from the reception request transmitting means 3*a*, and a main information receiving means 3*b* disposed in each of the receiving stations 3, for receiving the main information from the main information transmitting means 1*b* through the circuit which has been indicated from the circuit indicating means 2*c* to the receiving station of its own.

The circuit control apparatus for the satellite communication system according to the present invention will be described in specific detail below with reference to FIGS. 2 through 10. Correspondence between the detailed arrangements shown in FIGS. 2 through 10 and the principles shown in FIG. 1 will be described later on following the description of the detailed arrangements shown in FIGS. 2 through 10.

Figure 2:
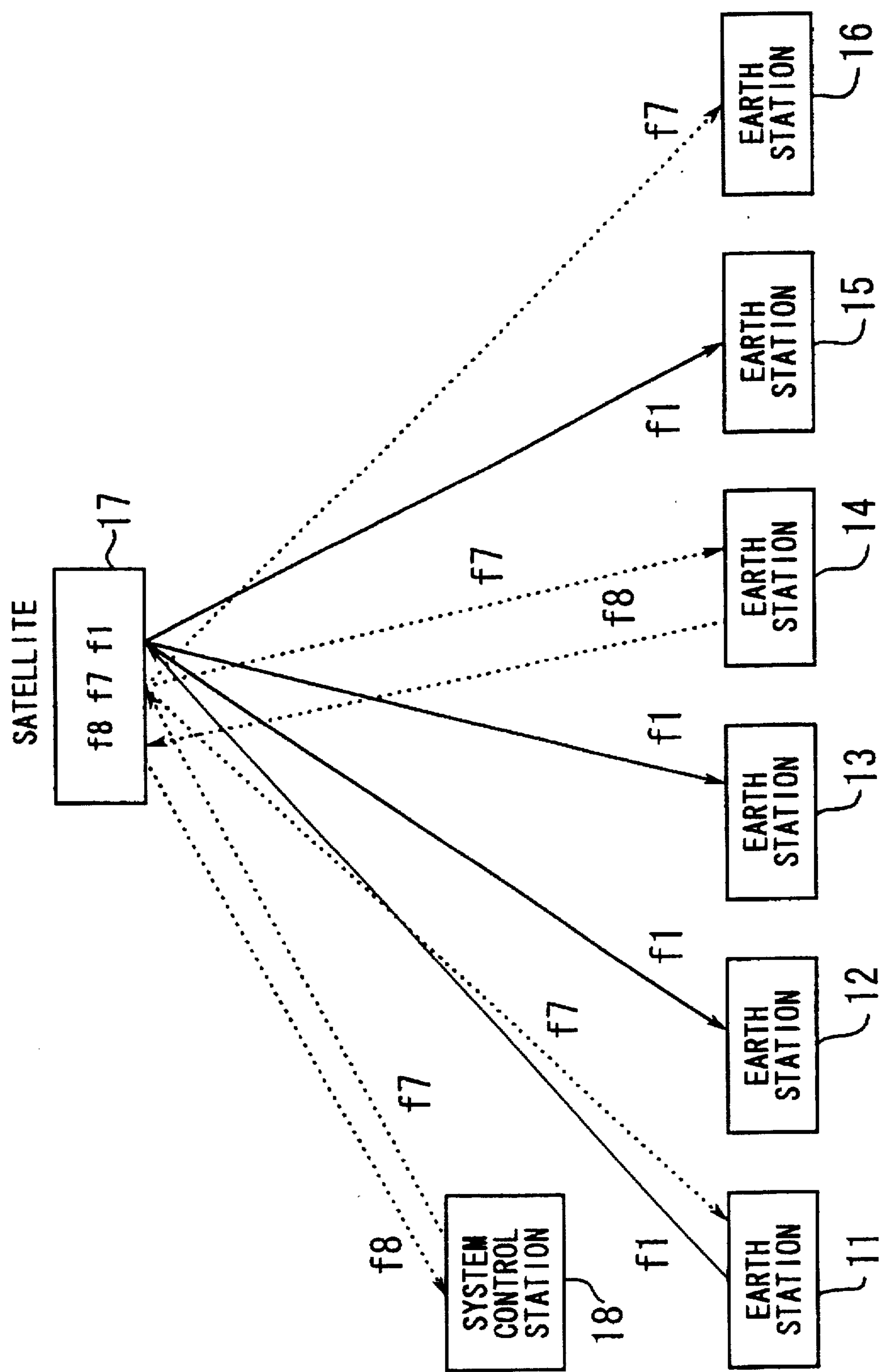
FIG. 2 is a block diagram of a satellite communication system as a whole.

FIG. 2 shows in block form the satellite communication system as a whole. As shown in FIG. 2, the satellite communication system has earth stations 11~16, and the earth stations 11, 14 function as transmitting stations via a communication satellite 17, and the earth stations 12, 13, 15, 16 function as receiving stations via the communication satellite 17. The transmission of information from the transmitting stations to the receiving stations is carried out using either one of main information transmitting circuits f1~f6 (f2~f6 being not shown) in a 1 to N system configuration. In the illustrated embodiment, the earth station 11 is transmitting main information to the earth stations 12, 13, 15 through the main information transmitting circuits f1. A system control station 18 is connected to the earth stations 11~16 through control circuits f7, f8 via the communication satellite 17. The control circuit f7 is a circuit directed from the system control station 18 toward the earth stations 11~16, and the control circuit f8 is a circuit directed from the earth stations 11~16 toward the system control station 18. In the illustrated embodiment, the earth station 14 is transmitting a transmission request signal to the system control station 18 through the control circuit r8, and the system control station 18 is transmitting assignment circuit information to the earth station 14 through the control circuit f7, as described in detail later on. The system control station 18 transmits a list of transmitting stations and data on the number of receiving stations to the earth stations 11, 16 through the control circuit f7. The earth station 11 transmits the received data on the number of receiving stations, as multiplexed with the main information being transmitted, through the main information transmitting circuits f1, to the earth stations 12, 13, 15.

In the embodiment of the present invention, the earth stations 12, 13, 15, 16 which function as receiving stations are also capable of transmitting information to the system control station 18 through the control circuit f8, although they are not shown in the drawings.

Figure 3:
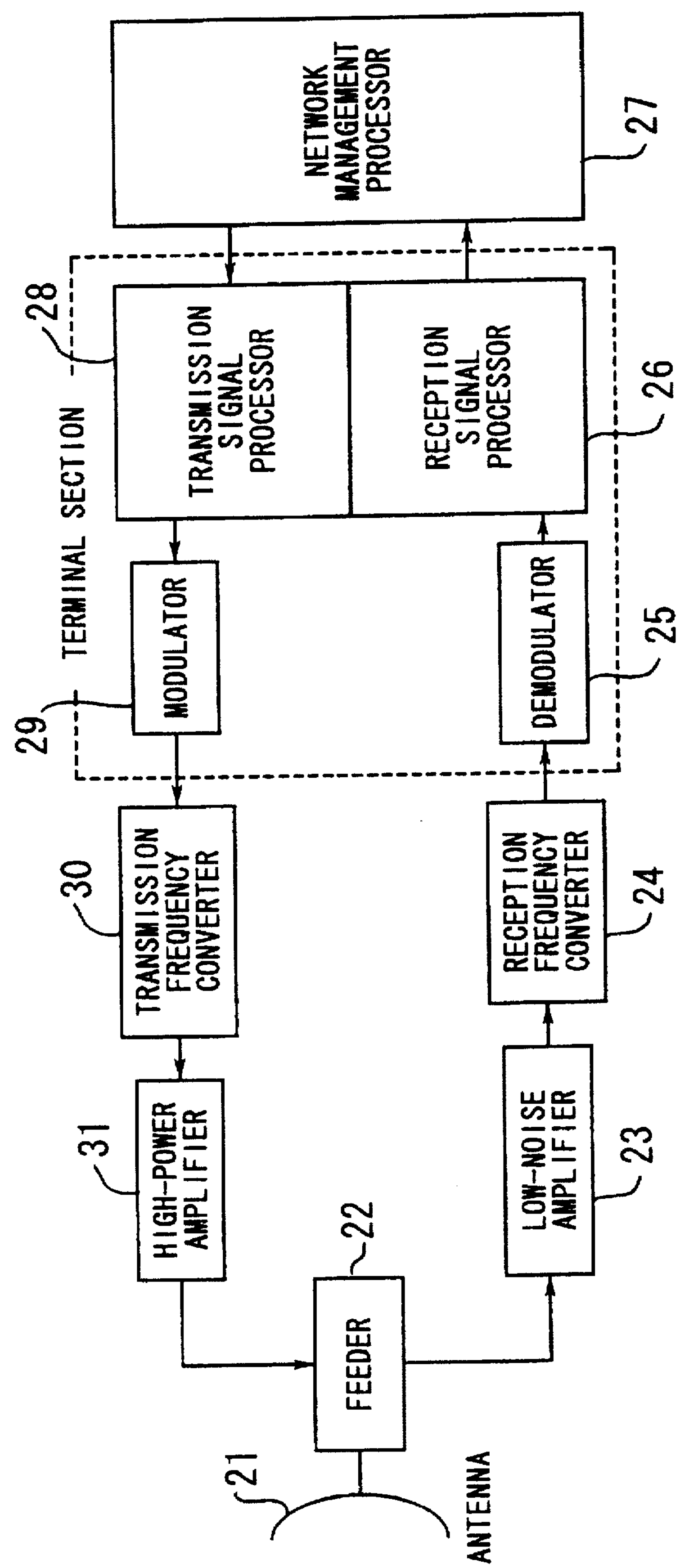
FIG. 3 is a block diagram of a system control station of the satellite communication system.

FIG. 3 shows in block form the system control station 18. As shown in FIG. 3, signals transmitted from the earth stations 11~16 are supplied through an antenna 21, a feeder 22, a low-noise amplifier 23, a reception frequency converter 24, a demodulator 25, and a reception signal processor 26 to a network management processor 27. The signals supplied to the network management processor 27 include a transmission request signal and a transmission stop signal from transmitting stations and a reception request signal and a reception stop signal from receiving stations. The network management processor 27 carries out processes which will be described later on with reference to FIGS. 4 through 6, and outputs a circuit assignment signal, a circuit indicating signal, a list of transmitting stations, and data on the number of receiving stations. The outputted signals and data are transmitted through a transmission signal processor 28, a modulator 29, a transmission frequency converter 30, a high-power amplifier 31, the feeder 22, and the antenna 21 to the earth stations 12, 13, 15, 16. The circuit assignment signal is transmitted to transmitting stations, and the circuit indicating signal is transmitted to receiving stations. The list of transmitting stations and the data on the number of receiving stations are transmitted to all the stations. These out-putted signals and data are transmitted with an address added to the header of information, and a station which has received the transmitted signal or data decides whether the received signal or data are destined for itself or not based on the added address.

Figure 4:
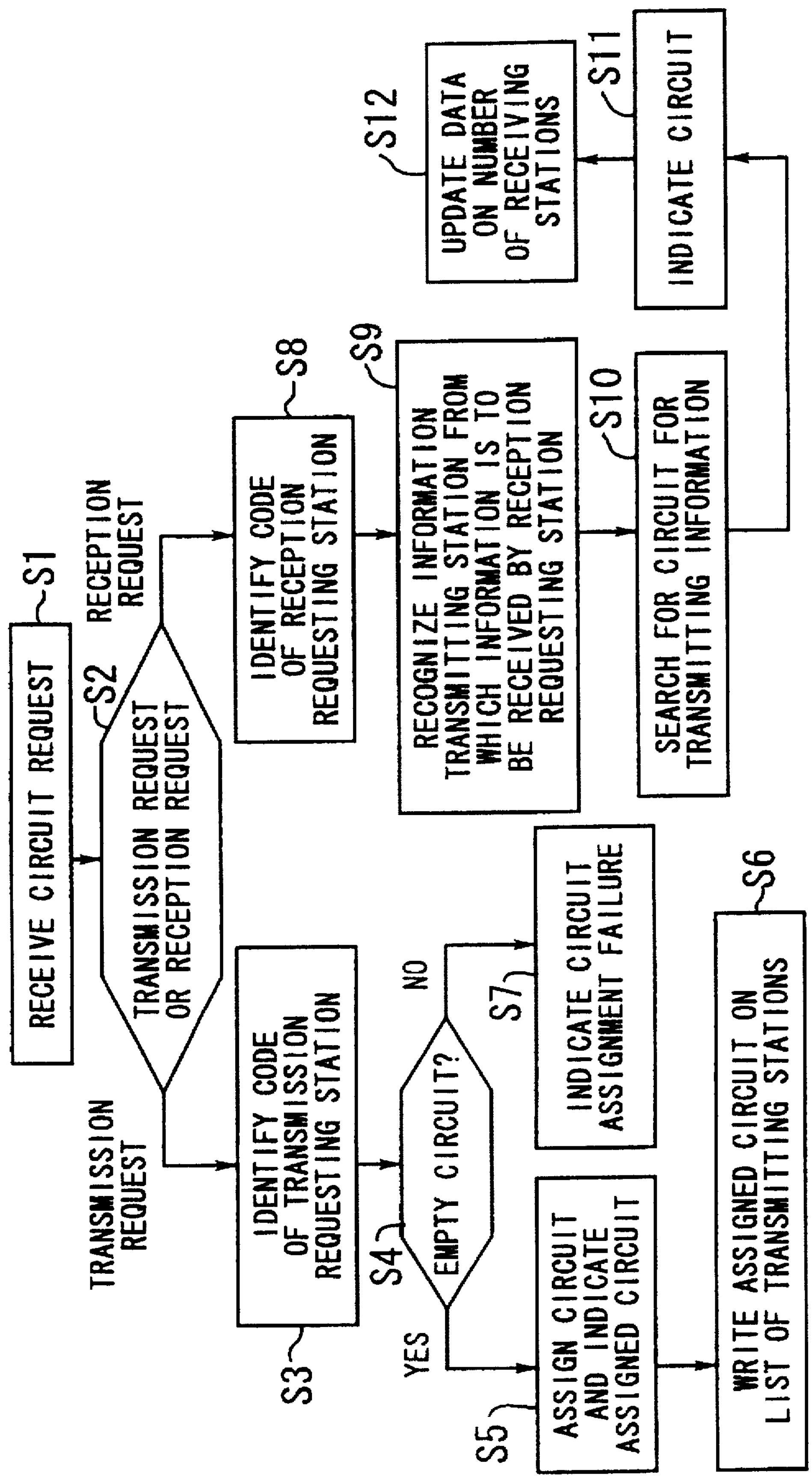
FIG. 4 is a flowchart of a procedure for processing transmission and reception requests, which is executed by a network management processor in the system control station shown in FIG. 3.

FIG. 4 shows a procedure for processing transmission and reception requests, which is executed by the network management processor 27. The procedure shown in FIG. 4 will be described below with respect to its steps S1 through S12.

[S1] The network management processor 27 receives a circuit request.

[S2] If the received request is a transmission request, then control proceeds to a step S3, and if the received request is a reception request, then control proceeds to a step S8. The transmission request is a request from a transmitting station, indicating that the transmitting station wants to start a transmission and needs a circuit which can be used for the transmission. The transmission request is transmitted together with the identification code of the transmitting station. The reception request is a request from a receiving station, indicating that the receiving station wants to receive main information from a certain transmitting station and needs to know a circuit through which the transmitting station is transmitting the main information. The reception request is transmitted together with the identification code of the receiving station and the identification code of the certain transmitting station.

[S3] The network management processor 27 identifies the transmitting station which has transmitted the transmission request, from the identification code transmitted therewith.

[S4] The network management processor 27 checks if there is an empty circuit which is used or not. If there is an empty circuit, then control proceeds to a step S5, and if there is no empty circuit, then control proceeds to a step S7.

[S5] The network management processor 27 assigns the empty circuit as a circuit that can be used by the transmitting station, and indicates the circuit to the transmitting station which has transmitted the transmission request.

[S6] The network management processor 27 writes the newly assigned circuit and the transmitting station on a list of transmitting stations. The system control station 18 periodically transmits the list of transmitting stations to each of the stations. If a receiving station is not turned to the control circuit f7, i.e., is turned to any one of the main information transmitting circuits fl~f6, then the list of transmitting stations cannot be transmitted to that receiving station. However, since the system control station 18 periodically transmits the list of transmitting stations, that receiving station can eventually receive the list of transmitting stations when it is tuned to the control circuit f7 after the completion of reception of main information.

[S7] The network management processor 27 indicates that there is no empty circuit and no circuit can be assigned, to the transmitting station which has made the transmission request.

[S8] The network management processor 27 recognizes the receiving station which has transmitted the reception request, from the identification code transmitted therewith.

[S9] The network management processor 27 recognizes the transmitting station from which main information is to be received, from the identification code of the transmitting station.

[S10] The network management processor 27 searches for a circuit which is being used by the transmitting station that is recognized in the step S9.

[S11] The network management processor 27 indicates the circuit that has been located in the step S10 to the receiving station which has transmitted the reception request.

[S12] The network management processor 27 updates the recorded data on the number of receiving stations with respect to each of the transmitting stations. The system control station 18 periodically transmits the data on the number of receiving stations to each of the stations. If a receiving station is not turned to the control circuit f7, i.e., is turned to any one of the main information transmitting circuits f1~f6, then the data on the number of receiving stations cannot be transmitted to that receiving station. In such a case, the transmitting station which has received the data on the number of receiving stations transmits the data on the number of receiving stations, as multiplexed with the main information being transmitted, through either one of the main information transmitting circuits f1~f6, to that receiving station.

Figure 5:
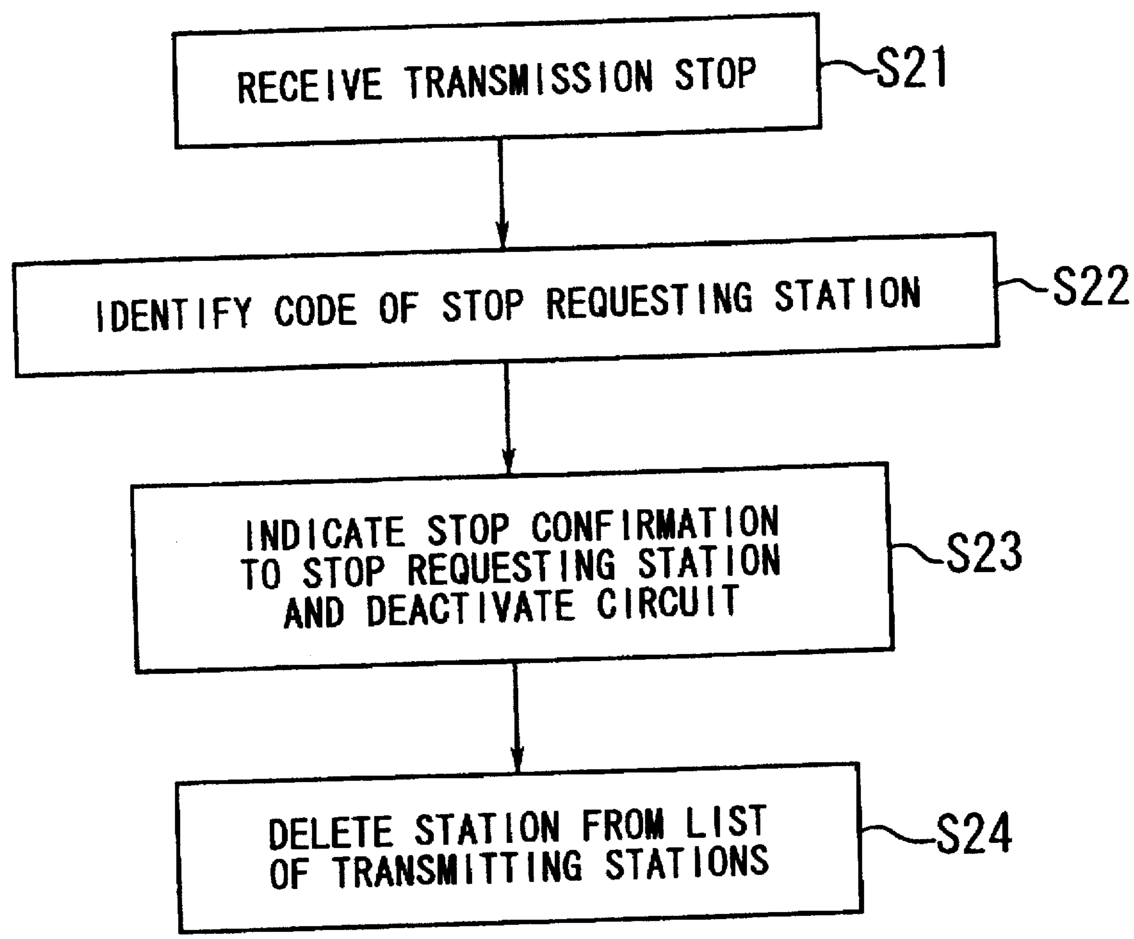
FIG. 5 is a flowchart of a transmission stopping process of the network management processor.

FIG. 5 shows a transmission stopping process of the network management processor 27. The transmission stopping process will be described below with respect to its steps S21 through S24.

[S21] The network management processor 27 receives a signal indicative of a transmission stop from a transmitting station.

[S22] The network management processor 27 recognizes the transmitting station which has requested the transmission stop, from the identification code transmitted therewith.

[S23] The network management processor 27 sends a confirmation of the transmission stop to the transmitting station which has requested the transmission stop, and deactivates the circuit assigned to the transmitting station, making it an empty circuit.

[S24] The network management processor 27 deletes that station from the list of transmitting stations. The network management processor 27 periodically transmits the list of transmitting stations to all the stations. Any receiving station which is not tuned to the control circuit f7 at the time receives the list of transmitting stations when it is tuned to the control circuit f7.

Figure 6:
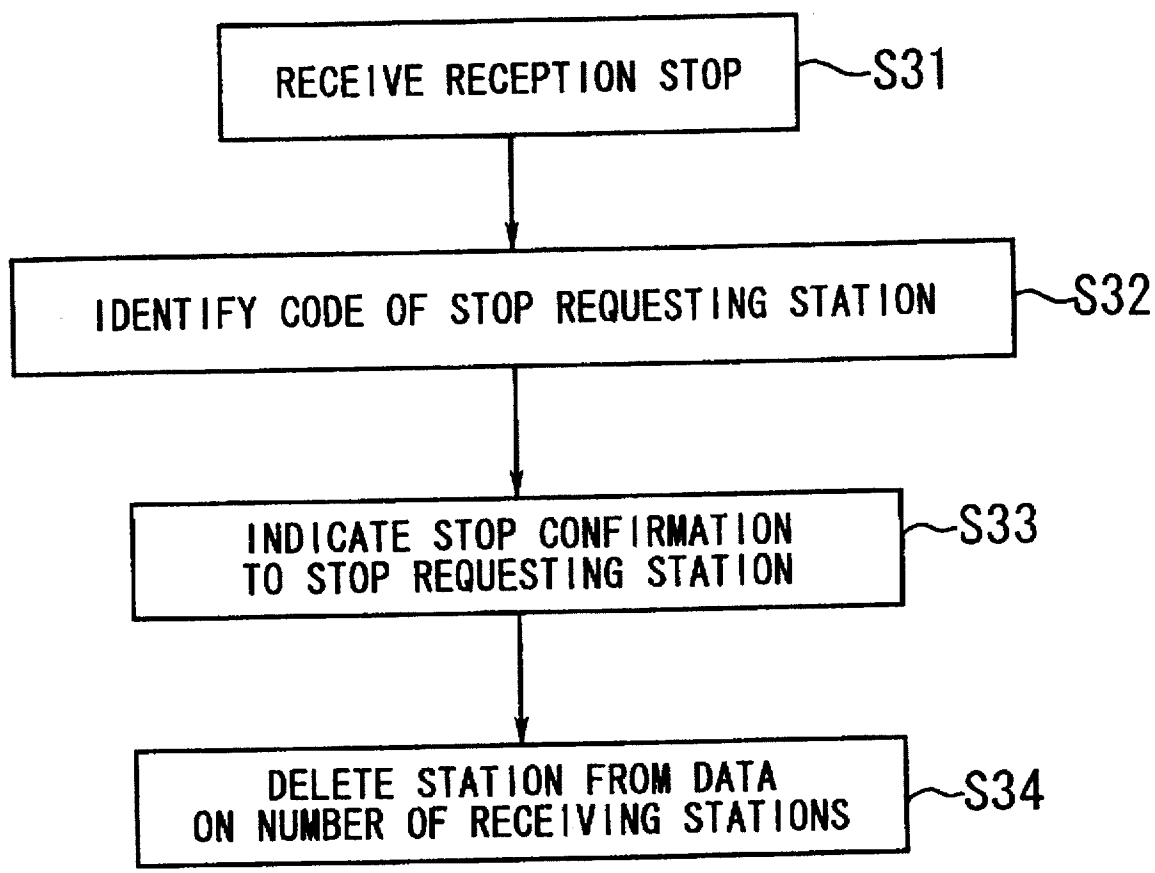
FIG. 6 is a flowchart of a reception stopping process of the network management processor.

FIG. 6 shows a reception stopping process of the network management processor 27. The reception stopping process will be described below with respect to its steps S31 through S34.

[S31] The network management processor 27 receives a signal indicative of a reception stop from a receiving station.

[S32] The network management processor 27 recognizes the receiving station which has requested the reception stop, from the identification code transmitted therewith.

[S33] The network management processor 27 sends a confirmation of the reception stop to the receiving station which has requested the reception stop.

[S34] The network management processor 27 deletes that station from the data on the number of receiving stations. The network management processor 27 periodically transmits the data on the number of receiving stations to all the stations. To any receiving station which is not tuned to the control circuit f7 at the time, the transmitting station which has received the data on the number of receiving stations transmits the data on the number of receiving stations, as multiplexed with the main information, through either one of the main information transmitting circuits f1~f6.

Figure 7:
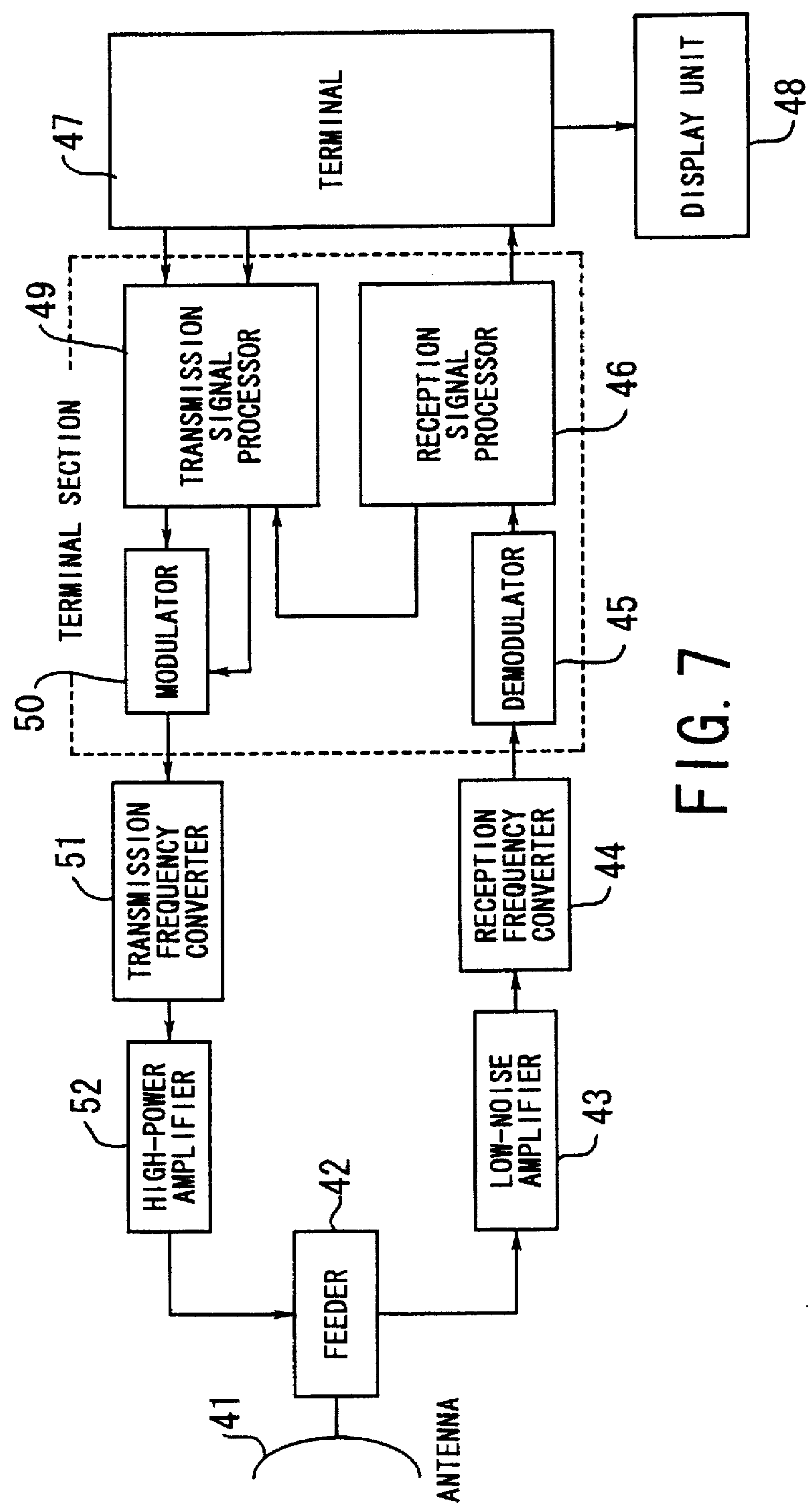
FIG. 7 is a block diagram of a transmitting station.

FIG. 7 shows in block form a transmitting station such as the earth stations 11, 14. As shown in FIG. 7, a signal transmitted from the system control station 18 through the control circuit f7 is supplied through an antenna 41, a feeder 42, a low-noise amplifier 43, a reception frequency converter 44, and a demodulator 45 to a reception signal processor 46. If the reception signal processor 46 receives a circuit assignment signal for its own station as a result of having transmitted a transmission request to the system control station 18, as described later, the reception signal processor 46 designates a circuit for a transmission signal processor 49, and at the same time, indicates "CIRCUIT DESIGNATION OK" to a terminal 47. If the reception signal processor 46 receives a circuit assignment failure signal for its own station, then the reception signal processor 46 indicates "CIRCUIT DESIGNATION FAILURE" to the terminal 47. When the reception signal processor 46 receives a list of transmitting stations and data on the number of receiving stations from the system control station 18, the reception signal processor 46 transfers the list of transmitting stations and the data on the number of receiving stations to the terminal 47.

The terminal 47 has a display unit 48 for displaying data on the number of receiving stations and information indicative of whether it is possible or impossible to make a circuit designation, which have been transmitted from the system control station 18. The terminal 47 multiplexes data on the number of receiving stations with main information, and transmits the multiplexed data to the transmission signal processor 49, and also transmits a transmission request signal and a transmission stop signal to the transmission signal processor 49.

Figure 8:
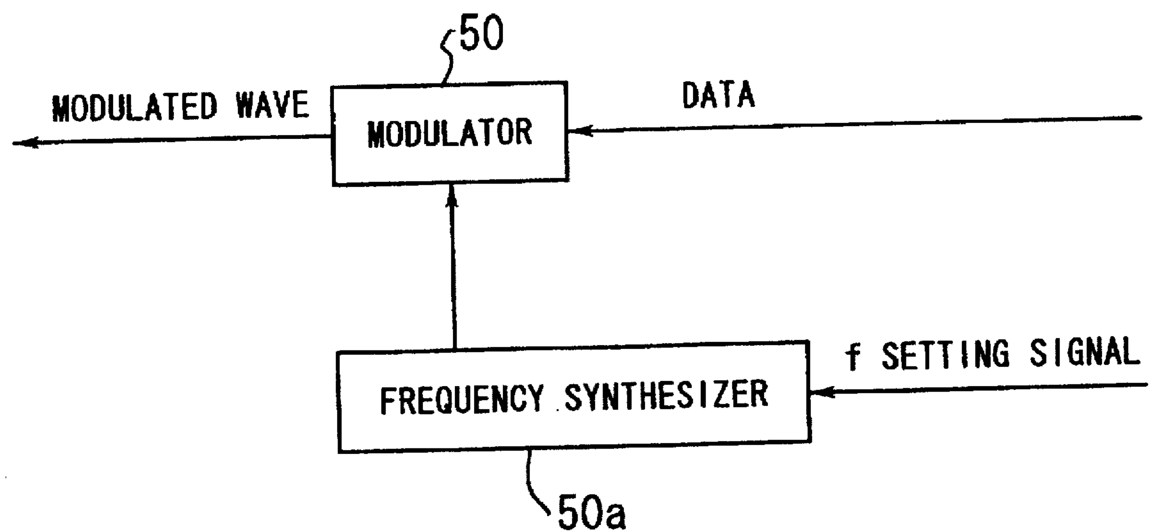
FIG. 8 is a block diagram illustrative of the manner in which a modulator in the transmitting station operates.

When a transmission request signal is received from the terminal 47, the transmission signal processor 49 outputs a transmission request signal together with an identification code of its own station. The transmission request signal together with the identification code is transmitted through a modulator 50, a transmission frequency converter 51, a high-power amplifier 52, the feeder 42, and the antenna 41 to the system control station 18 via the control circuit f8. When a circuit is designated by the reception signal processor 46, the transmission signal processor 49 establishes the designated circuit (frequency) with respect to the modulator 50. Specifically, as shown in FIG. 8, an f setting signal indicative of the designated circuit is transmitted from the transmission signal processor 49 to a frequency synthesizer **50*a* associated with the modulator 50, and the frequency synthesizer 50*a* sends a signal having a frequency corresponding to the designated circuit to the modulator 50. The modulator 50** modulates the signal, which is used as a carrier, with the main information that is multiplexed with the data on the number of receiving stations. As a consequence, the main information is transmitted through the main information transmitting circuit f1, for example.

When a transmission stop signal is received from the terminal 47, the transmission signal processor 49 stops transmitting the main information through the main information transmitting circuit f1, and instructs the modulator 50 to establish the control circuit f8. The transmission signal processor 49 then indicates a transmission stop to the system control station 18 through the control circuit f8.

Figure 9:
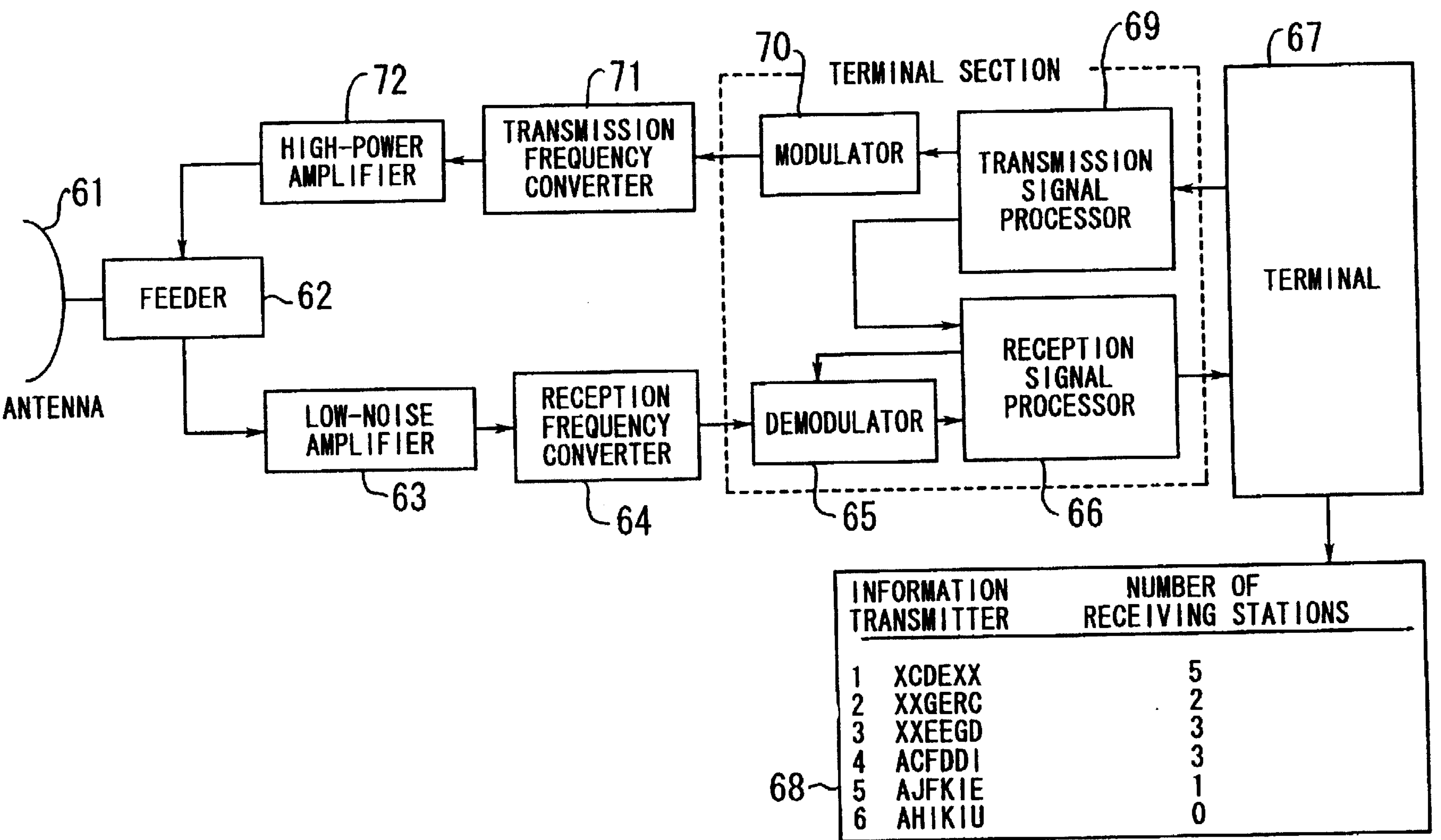
FIG. 9 is a block diagram of a receiving station.
Figure 10:
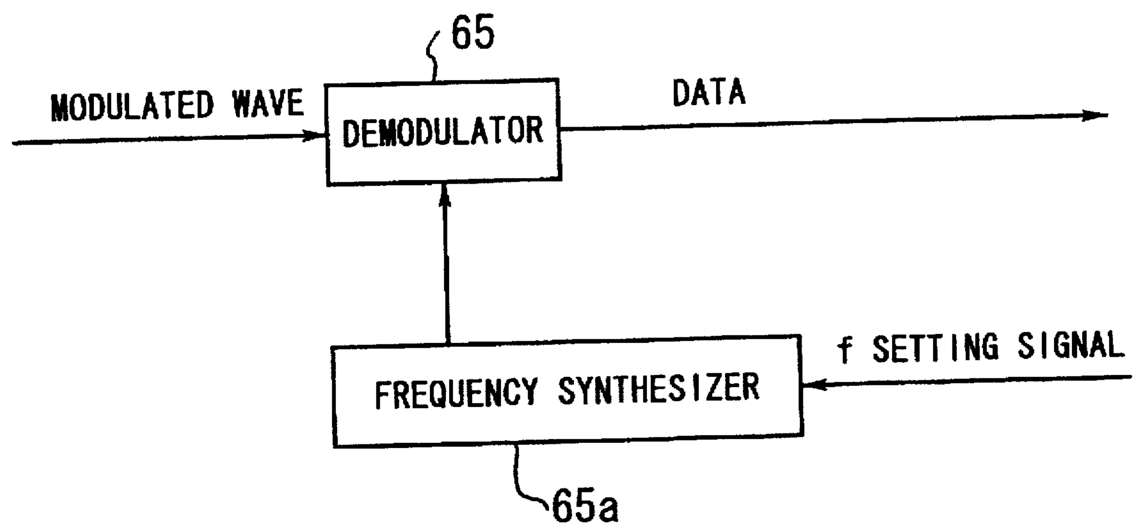
FIG. 10 is a block diagram illustrative of the manner in which a demodulator in the receiving station operates.

FIG. 9 shows in block form a receiving station such as the earth stations 12, 13, 15, 16. As shown in FIG. 9, a signal transmitted from the system control station 18 through the control circuit f7 is supplied through an antenna 61, a feeder 62, a low-noise amplifier 63, a reception frequency converter 64, and a demodulator 65 to a reception signal processor 66. The demodulator 65 has been tuned to the control circuit f7. A list of transmitting stations is periodically transmitted from the system control station 18 through the above route to a reception terminal 67. If the reception signal processor 66 receives a circuit designation signal for its own station as a result of having transmitted a reception request to the system control station 18, as described later, the reception signal processor 66 designates a circuit for the demodulator 65. Specifically, as shown in FIG. 10, an f setting signal indicative of the designated circuit is transmitted from the reception signal processor 66 to a frequency synthesizer **65*a* associated with the demodulator 65, and the frequency synthesizer 65*a* sends a signal having a frequency corresponding to the designated circuit to the demodulator 65. The demodulator 65 demodulates the modulated signal with the signal sent thereto. As a consequence, the main information is received through the main information transmitting circuit f1, for example. The demodulated signal is separated by the reception signal processor 66 into main information and data on the number of receiving stations, which are then delivered to the reception terminal 67**.

When a reception stop signal is received from a transmission signal processor 69, the reception signal processor 66 instructs the demodulator 65 to establish the control circuit f7 as described later on.

The reception terminal 67 has a display unit 68 for displaying the list of transmitting stations and the data on the number of receiving stations which have been transmitted from the system control station 18. When the operator designates a transmitting station that the operator wishes to receive information from with a cursor from the list of transmitting stations displayed on the display unit 68, the reception terminal 67 automatically sends a reception request signal to the transmission signal processor 69. The reception terminal 67 also operates to send a reception stop signal to the transmission signal processor 69.

When the reception request signal is received from the reception terminal 67, the transmission signal processor 69 outputs a reception request signal together with the identification code of its own station and the identification code of the transmitting station which has been designated with the cursor, and transmits them through a modulator 70, a transmission frequency converter 71, a high-power amplifier 72, the feeder 62, and the antenna 61 to the system control station 18 via the control circuit f8. When a reception stop signal is received from the reception terminal 67, the transmission signal processor 69 causes the reception signal processor 66 to stop receiving the main information through the main information transmitting circuit f1, and then indicates a reception stop to the system control station 18.

The transmitting station 1 shown in FIG. 1 corresponds to the transmitting station shown in FIG. 7, and the transmission request transmitting means **1*a* and the main information transmitting means 1*b* shown in FIG. 1 correspond to the terminal 47 and the transmission signal processor 49 shown in FIG. 7. The system control station 2 shown in FIG. 1 corresponds to the system control station shown in FIG. 3, and the circuit assigning means 2*a*, the transmitting station list transmitting means 2*b*, and the circuit indicating means 2*c* shown in FIG. 1 correspond to the network management network 27 and the transmission signal processor 28 shown in FIG. 3. The receiving station 3 shown in FIG. 1 corresponds to the receiving station shown in FIG. 9, and the reception request transmitting means 3*a* shown in FIG. 1 corresponds to the reception terminal 67 and the transmission signal processor 69 shown in FIG. 9. The main information receiving means 3*b* shown in FIG. 1 corresponds to the reception terminal 67 and the reception signal processor 66 shown in FIG. 9**.

Operation of the circuit control apparatus for the satellite communication system according to the embodiment of the present invention will be described below with reference to FIGS. 11 through 13.

Figure 11:
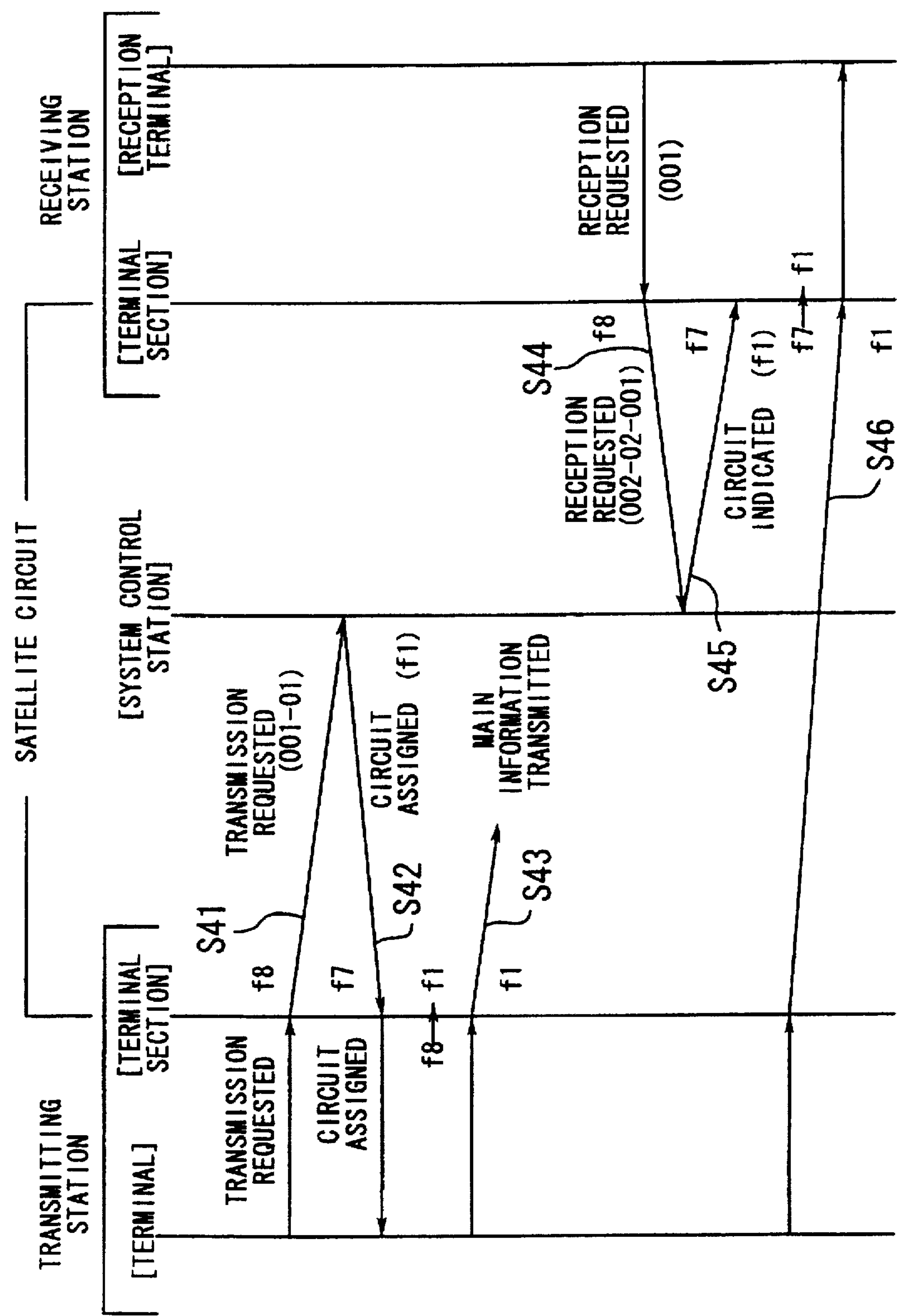
FIG. 11 is a sequence diagram showing an operation sequence of the satellite communication system in response to transmission and reception requests.

FIG. 11 shows an operation sequence of the satellite communication system in response to transmission and reception requests. The operation sequence shown in FIG. 11 will be described below with respect to its steps S41 through S46.

[S41] When a transmission request is outputted from the terminal 47 of a transmitting station, a transmission request signal is transmitted from a terminal section of the transmitting station to the system control station 18 through the control circuit f8. The transmission request signal comprises a transmitting station identification code "001" and a transmission request identification code "01".

[S42] If there is an empty circuit, then the system control station 18 assigns a circuit. In this case, the system control station 18 assigns the circuit f1 and indicates the assigned circuit f1 to the transmitting station through the control circuit f7. The transmitting station is in a condition to receive any information at all times through the control circuit f7. The terminal section of the transmitting station indicates "CIRCUIT ASSIGNMENT OK" to the terminal 47.

[S43] The transmitting station changes the transmission frequency (circuit) from the control circuit f8 to the assigned main information transmitting circuit f1, and starts transmitting main information therethrough.

[S44] Prior to outputting a reception request, a receiving station receives a list of transmitting stations periodically transmitted from the system control station 18 through the control circuit f7. Based on the received list of transmitting stations, the receiving station determines a transmitting station from which it is to receive information. When a reception request to receive main information from the transmitting station with the identification code "001" is received from the terminal 67 of the receiving station, a terminal section of the receiving station transmits a reception request signal to the system control station 18 through the control circuit f8. The reception request signal comprises a receiving station identification code "002", a reception request identification code "02", and the transmitting station identification code "001".

[S45] The system control station 18 locates the circuit f1 through which the transmitting station with the transmitting station identification code "001" has been transmitting the main information, and indicates the circuit f1 to the receiving station through the control circuit f7.

[S46] The receiving station changes the reception frequency (circuit) from the control circuit f7 to the indicated main information transmitting circuit f1, and starts receiving the main information therethrough.

Figure 12:
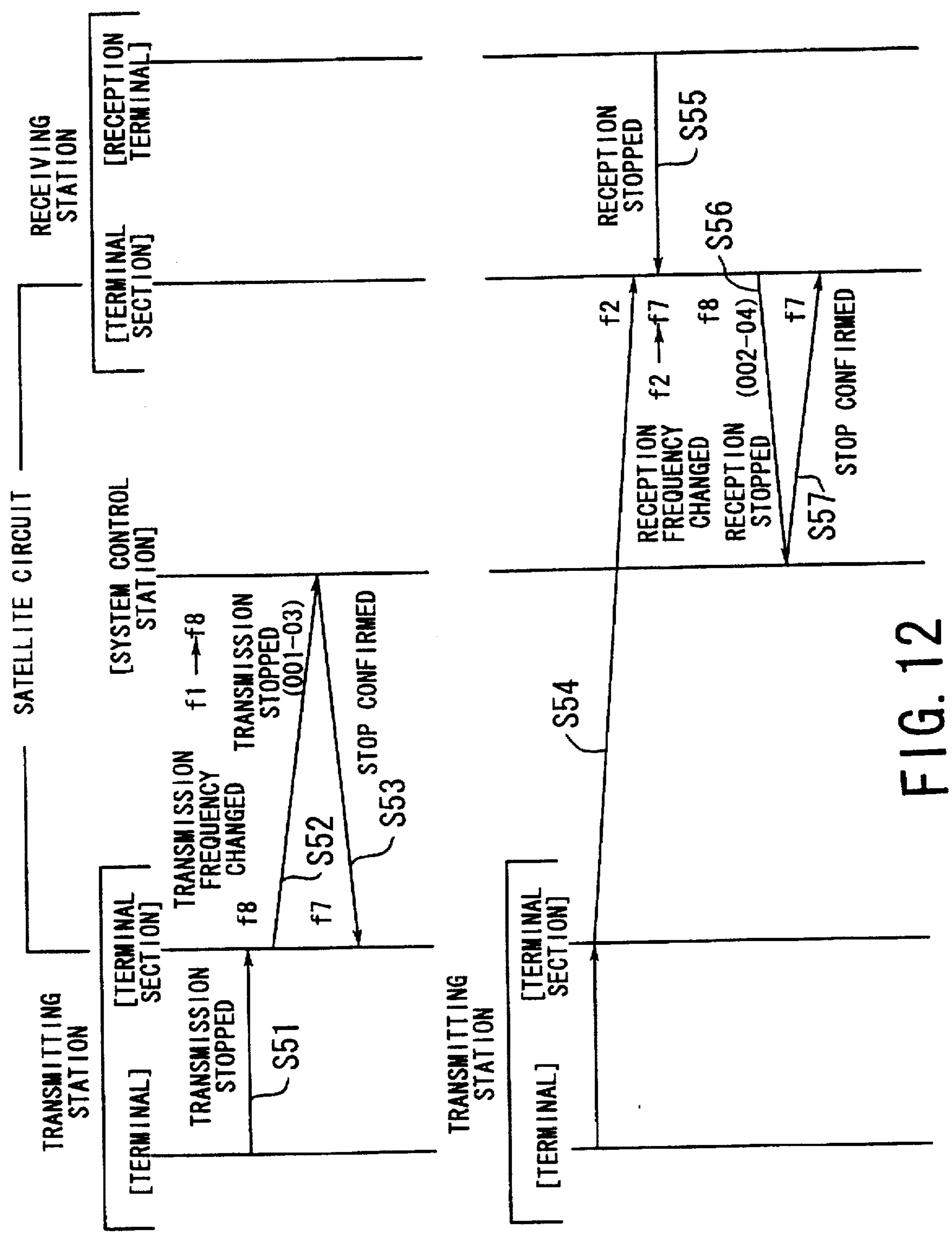
FIG. 12 is a sequence diagram showing an operation sequence of the satellite communication system in response to transmission and reception stop requests.

FIG. 12 shows an operation sequence of the satellite communication system in response to transmission and reception stop requests. The operation sequence shown in FIG. 12 will be described below with respect to its steps S51 through S57.

A transmission stop request is processed as follows:

[S51] When a transmission stop request is outputted from the terminal 47 of a transmitting station, a terminal section of the transmitting station stops transmitting main information, and changes the transmission frequency (circuit) from the main information transmitting circuit f1 to the control circuit f8.

[S52] The transmitting station transmits a transmission stop signal to the system control station 18 through the control circuit f8. The transmission stop signal comprises a transmitting station identification code "001" and a transmission stop identification code "03".

[S53] The system control station 18 transmits a stop confirmation signal to the transmitting station through the control circuit f7.

A reception stop request is processed as follows:

[S54] A transmitting station is transmitting main information through the main information transmitting circuit f2.

[S55] When a reception stop request is outputted from the terminal 67 of a receiving station, a terminal section of the receiving station stops receiving the main information, and changes the reception frequency (circuit) from the main information transmitting circuit f2 to the control circuit f7.

[S56] The receiving station transmits a reception stop signal to the system control station 18 through the control circuit f8. The reception stop signal comprises a receiving station identification code "002" and a reception stop identification code "04".

[S57] The system control station 18 transmits a stop confirmation signal to the receiving station through the control circuit f7.

Figure 13:
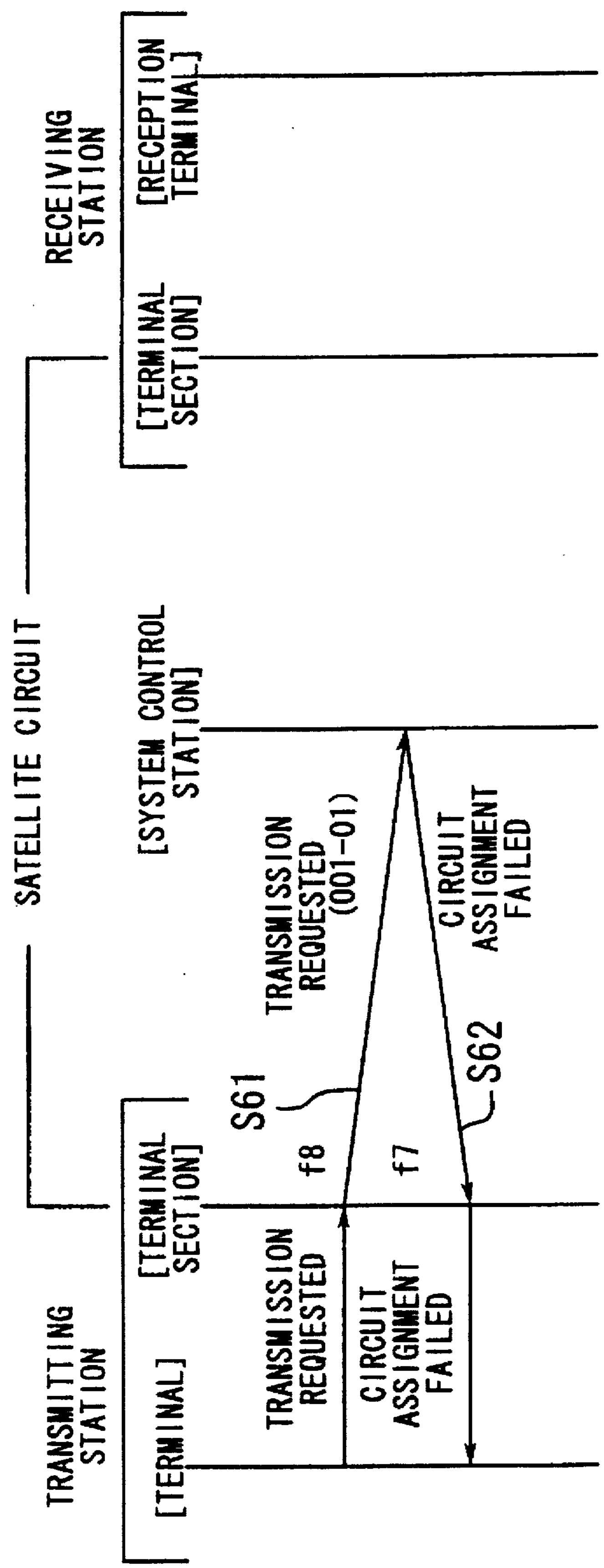
FIG. 13 is a sequence diagram showing an operation sequence of the satellite communication system at the time a circuit assignment is impossible to make.

FIG. 13 shows an operation sequence of the satellite communication system at the time a circuit assignment is impossible to make.

[S61] When a transmission request is outputted from the terminal 47 of a transmitting station, a terminal section of the transmitting station transmits a transmission request signal to the system control station 18 through the control circuit f8.

[S62] If the system control station 18 cannot locate any empty circuit after it has searched for an empty circuit, the system control station 18 indicates that it is impossible to assign a circuit to the transmitting station through the control circuit f7. The terminal section of the transmitting station indicates "CIRCUIT ASSIGNMENT FAILURE" to the terminal 47.

With the above arrangement, it is possible to apply the demand-assignment principles to the 1 to N satellite communication system.

According to the above embodiment, any receiving station employs the control circuit f8 to transmit a reception request signal to the system control station 18. The system control station 18 is thus capable of recognizing the number of receiving stations per transmitting station, and indicating the number of receiving stations to each of receiving and transmitting stations. The operator of each receiving station can easily connect the receiving station to the circuit of a transmitting station without concern over the transmission frequency of the transmitting station.

Each receiving station may not have a transmission capability. According to such a modification, it is impossible to perform the service of transmitting data on the number of receiving stations and also to connect a receiving station to the circuit of a transmitting station without concern over the transmission frequency of the transmitting station. However, insofar as the list of transmitting stations contains information with respect to the transmission frequency, the operator of each receiving station can connect the receiving station to the circuit of a transmitting station.

The network management processor 27 of the system control station 18 shown in FIG. 3 may measure a period of time required for a transmitting station to transmit main information, and use the measured period of time for charging the transmitting station for the use of the circuit. Specifically, the network management processor 27 measures a period of time from the time it transmits a circuit assignment signal to the transmitting station to the time it receives a transmission stop signal from the transmitting station. At this time, the transmission signal processor 49 of the transmitting station shown in FIG. 7 may measure a period of time over which its own transmitting station transmits the main information and use the measured period of time in deciding whether the period of time measured by the system control station 18 is correct or not, i.e., whether the charged amount is correct or not. More specifically, the transmission signal processor 49 may measure a period of time from the time a circuit designation is made by the reception signal processor 46 to the time a transmission stop signal is received from the terminal 47.

Furthermore, the network management processor 27 of the system control station 18 shown in FIG. 3 may measure a period of time required for a receiving station to receive main information, and use the measured period of time for charging the receiving station for the use of the circuit. Specifically, the network management processor 27 measures a period of time from the time it transmits a circuit indication signal to the receiving station to the time it receives a reception stop signal from the receiving station. At this time, the reception signal processor 66 of the receiving station shown in FIG. 9 may measure a period of time over which its own receiving station receives the main information and use the measured period of time in deciding whether the period of time measured by the system control station 18 is correct or not, i.e., whether the charged amount is correct or not. More specifically, the reception signal processor 66 may measure a period of time from the time it receives a circuit indication signal from the system control station 18 to the time it receives a reception stop signal from the transmission signal processor 69.

According to the present invention, as described above, a circuit is assigned in response to a request from a transmitting station, information with respect to the assigned circuit is indicated to a receiving station at all times, and the receiving station selects the circuit based on the information. Consequently, it is possible to apply the demand-assignment principles to the 1 to N satellite communication system, so that frequencies can be utilized effectively.

Because the demand-assignment principles are applied, no circuit is fixed to any transmitting station, but circuits can easily be changed for use by any transmitting station. Accordingly, satellite transponders are allowed to change their mode of use with freedom.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for controlling circuits of a satellite communication system having a plurality of transmitting stations, a plurality of receiving stations, and a system control station, comprising:

transmission request transmitting means disposed in each of the transmitting stations, for transmitting a transmission request;

circuit assigning means disposed in the system control station, for assigning a circuit in response to the transmission request from said transmission request transmitting means;

main information transmitting means disposed in each of the transmitting stations, for transmitting main information to each of said receiving stations through a circuit which has been assigned to a transmitting station of its own by said circuit assigning means;

list-of-transmitting-stations transmitting means disposed in the system control station, for transmitting a list of transmitting stations to which circuits have been assigned to each of the receiving stations;

reception request transmitting means disposed in each of the receiving stations, for selecting a certain transmitting station from the list of transmitting stations transmitted from said list-of-transmitting-stations transmitting means and transmitting a reception request with respect to the selected transmitting station to the system control station;

circuit indicating means disposed in the system control station, for indicating a circuit of the selected transmitting station to a receiving station from which a reception request has been transmitted, in response to the reception request from said reception request transmitting means; and main information receiving means disposed in each of the receiving stations, for receiving the main information from said main information transmitting means through the circuit which has been indicated from said circuit indicating means to the receiving station of its own.

2. An apparatus according to claim 1, wherein said transmission request transmitting means comprises means for transmitting a transmission request including an identification code of the transmitting station of its own.

3. An apparatus according to claim 1, wherein said reception request transmitting means comprises means for transmitting a reception request including an identification code of the receiving station of its own and an identification code of the selected transmitting station.

4. An apparatus according to claim 1, further comprising:

number-of-receiving-stations indicating means disposed in a system control station, for determining the number of receiving stations per transmitting station based on the reception request from said reception request transmitting means, and indicating the number of receiving stations to each of the receiving stations.

5. An apparatus according to claim 4, further comprising:

display means disposed in each of the receiving stations, for displaying the number of receiving stations indicated from said number-of-receiving-stations indicating means.

6. An apparatus according to claim 1, further comprising:

number-of-receiving-stations indicating means disposed in a system control station, for determining the number of receiving stations per transmitting station based on the reception request from said reception request transmitting means, and indicating the number of receiving stations to each of the transmitting stations.

7. An apparatus according to claim 6, further comprising:

display means disposed in each of the transmitting stations, for displaying the number of receiving stations indicated from said number-of-receiving-stations indicating means.

8. An apparatus according to claim 6, further comprising:

number-of-receiving-stations multiplexing means disposed in each of the transmitting stations, for transmitting the number of receiving stations indicated from said number-of-receiving-stations indicating means, as multiplexed with the main information transmitted from said main information transmitting means of the transmitting station of its own.

9. An apparatus according to claim 1, further comprising:

display means disposed in each of the receiving stations, for displaying the list of transmitting stations transmitted from said list-of-transmitting-stations transmitting means.

10. An apparatus for controlling circuits of a satellite communication system having a 1 to N system configuration including transmitting stations, receiving stations, and a system control station connected to the transmitting and receiving stations, comprising:

transmission request transmitting means disposed in each of the transmitting stations, for transmitting a transmission request;

circuit assigning means disposed in the system control station, for assigning a circuit in response to the transmission request from said transmission request transmitting means;

main information transmitting means disposed in each of the transmitting stations, for transmitting main information to a number of indefinite receiving stations through a circuit which has been assigned to a transmitting station of its own by said circuit assigning means;

list-of-circuits transmitting means disposed in the system control station, for transmitting a list of circuits which have been assigned to the transmitting stations to each of the receiving stations; and main information receiving means disposed in each of the receiving stations, for selecting a circuit of a certain transmitting station based on the list of circuits transmitted from said list-of-circuits transmitting means, and receiving the main information transmitted from the transmitting station through the selected circuit.

* * * * *